(12) United States Patent
Jang et al.

(10) Patent No.: US 6,738,227 B2
(45) Date of Patent: May 18, 2004

(54) NEGATIVE PRESSURE AIR BEARING SLIDER INCLUDING NEGATIVE PRESSURE RAIL WITH A PROTRUDING STEPPED PORTION

(75) Inventors: Dong-seob Jang, Seoul (KR); Gyu-chan Jun, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 194 days.

(21) Appl. No.: 09/822,858

(22) Filed: Apr. 2, 2001

(65) Prior Publication Data

US 2002/0008940 A1 Jan. 24, 2002

(30) Foreign Application Priority Data

Jul. 20, 2000 (KR) ........................................ 2000-41738

(51) Int. Cl.[7] .............................................. G11B 21/08
(52) U.S. Cl. .................................................. 360/263.3
(58) Field of Search ......................... 360/236.3, 235.8, 360/236.1, 236, 235.7, 235.6, 237

(56) References Cited

U.S. PATENT DOCUMENTS

| | | | | |
|---|---|---|---|---|
| 5,917,679 A | * | 6/1999 | Park et al. | 360/235.6 |
| 5,953,181 A | * | 9/1999 | Utsunomiya | 360/236.1 |
| 6,411,468 B1 | * | 6/2002 | Park et al. | 360/236.3 |
| 6,459,546 B1 | * | 10/2002 | Mundt et al. | 360/236.3 |

* cited by examiner

*Primary Examiner*—David Davis
(74) *Attorney, Agent, or Firm*—Sughrue Mion, PLLC

(57) ABSTRACT

A negative pressure air bearing slider includes a pair of front rails having a predetermined air inlet passage interposed therebetween at the front side of the slider where air enters, a negative pressure rail disposed at the rear of the front rails and forming air outlet passages connected to the air inlet passage, and forming a negative pressure space where negative pressure is generated according to the flow of air at the rear thereof, and a rear rail disposed at the rear of the negative pressure space, where a magnetic head is installed. In the slider, a stepped portion protruding toward the air outlet passages is formed at the negative pressure rail.

3 Claims, 3 Drawing Sheets

NEGATIVE PRESSURE AIR BEARING SLIDER INCLUDING NEGATIVE PRESSURE RAIL WITH A PROTRUDING STEPPED PORTION

BACKGROUND OF THE INVENTION

1. Field of the Invention

The present invention relates to a slider having a magnetic head installed thereon and floating at a predetermined height above a recording medium and, more particularly, to a negative pressure air bearing slider which maintains a stable float state by concurrently generating positive pressure and negative pressure.

2. Description of the Related Art

Magnetic recording/reproducing apparatuses such as hard disk drives include magnetic heads for recording and reproducing magnetic signals on and from a recording medium. As shown in FIG. 1, a magnetic head 10 is installed at a slider 20 provided at one end of a swing arm 30. The magnetic head 10 moves to a desired track position above a disk (not shown) which is a recording medium as the swing arm 30 pivots, to perform recording or reproducing information.

In this case, the slider 20 staying on the surface of the disk begins lifting due to wind generated as the disk rotates. Since an end portion of the swing arm 30 where the slider 20 is installed is elastically biased toward the surface of the disk, when the disk stops rotating, the slider 20 lands on the surface of the disk.

The slider 20 can be lifted due to the pressure by the air entering between the surface of the disk and the slider 20 during the rotation of the disk with respect to the slider 20. Since the air entering between the surface of the disk and the slider 20 during the rotation of the disk serves as a bearing, the slider 20 can be lifted and continuously float above the disk.

However, if only the positive pressure which lifts the slider 20 is continuously generated, the slider 20 is not maintained at the uniform height, but fluctuates unstably. Accordingly, a negative pressure bearing slider which generates negative pressure to pull the slider 20 toward the surface of the disk, concurrently with positive pressure, is widely adopted.

FIG. 2 shows the negative pressure air bearing slider 20. As shown in the drawing, a plurality of rails 22, 23 and 24 for generating positive pressure and negative pressure by air are provided at the slider 20. Two front rails 22 are arranged at the front side of the slider 20 where air enters, forming an air inlet passage 21 interposed therebetween. A negative pressure rail 23 having a boomerang shape is formed at the rear side of the slider 20. Space 28 formed between the front rails 22 and the negative pressure rail 23 is for generating positive pressure. Since the air inlet passage 21 between two front rails 22 is wider than each of air outlet passages 26 through which air is exhausted along the negative pressure rail 23, the air stays in the space 28. Thus, as the air is accumulated in the positive pressure space 28, the pressure increases and affects the slider 20. Reference numeral 24 denotes a rear rail where a magnetic head 27 is installed. Negative pressure space 25 is formed between both wings of the boomerang-shaped negative pressure rail 23. The air in the negative pressure space 25 is exhausted together with air entering from the front side of the slider 20, passing above the negative pressure space 25, and exhausted toward the rear side of the slider 20. However, since the negative pressure rail 23 serves as a barrier for entering of air from the front side, new air is difficult to enter the negative pressure space 25. Thus, negative pressure is generated in the negative pressure space 25. The horizontal surfaces of the rails 22, 23 and 24 contribute to the generation of positive pressure. Consequently, the positive pressure generated by the positive pressure space 28 and the horizontal surfaces of the rails 22, 23 and 24 and the negative pressure generated by the negative pressure space 25 make the slider 20 float at a predetermined height in a balanced state.

As shown in FIG. 3, an angle made by the lengthwise direction of the slider 20 and the tangential direction of a track t of a disk D is referred to as a skew angle $\theta$. Since the swing arm 30 pivots around a pivot shaft as shown in the drawing, the skew angle cannot be maintained to be zero (0) at all tracks. When the skew angle $\theta$ occurs, since the slider 20 is not disposed to be symmetrical with respect to the input air, the amount of the air entering through the air inlet passage 21 and exhausted through the air exhaust passage 26 is much greater than that of the air passing above the negative pressure space 25. That is, when the skew angle $\theta$ is 0, the air entering the air inlet passage 21 is accurately collided with the middle portion of the negative pressure rail 23 and passes above the negative pressure space 25. Otherwise, after colliding with the negative pressure space 25, most air is exhausted through the air exhaust passages 26. Then, since the flow of air which will take the air in the negative pressure space 25 becomes weak, so that the negative pressure in the negative pressure space 25 is lowered, the floating height of the slider 20 cannot be stably maintained. Furthermore, since the flow of air toward the rear rail 24 where the magnetic head 27 is installed is not smooth, the positive pressure of the rear rail 24 is lowered so that the slider 20 floats unstably.

When the air exhaust passage 26 is narrowed by making the horizontal surface of the negative pressure rail 23 large, to solve the above problem, although the amount of air exhausted through the air exhaust passage can be reduced, since the area contacting the disk increases, the slider 20 can be easily damaged due to friction with the disk when the disk begins and ends rotation. Thus, a slider having an improved structure which can prevent the exhaust of air in a large amount through the air exhaust passage, without increasing the contact area with the disk, is needed.

SUMMARY OF THE INVENTION

To solve the above problems, it is an object of the present invention to provide a negative pressure bearing slider having an improved structure so that the exhaust of air in a large amount through an air exhaust passage can be effectively reduced.

Accordingly, to achieve the above object, there is provided a negative pressure air bearing slider comprising a pair of front rails having a predetermined air inlet passage interposed therebetween at a front side of the slider where air enters, a negative pressure rail disposed at a rear of the front rails and forming air outlet passages connected to the air inlet passage, and forming a negative pressure space where negative pressure is generated according to a flow of air at a rear thereof, and a rear rail disposed at the rear of the negative pressure space, where a magnetic head is installed, in which a stepped portion protruding toward the air outlet passages is formed at the negative pressure rail.

BRIEF DESCRIPTION OF THE DRAWINGS

The above object and advantages of the present invention will become more apparent by describing in detail preferred embodiments thereof with reference to the attached drawings, in which.

DETAILED DESCRIPTION OF THE PREFERRED EMBODIMENTS

Figure 1:
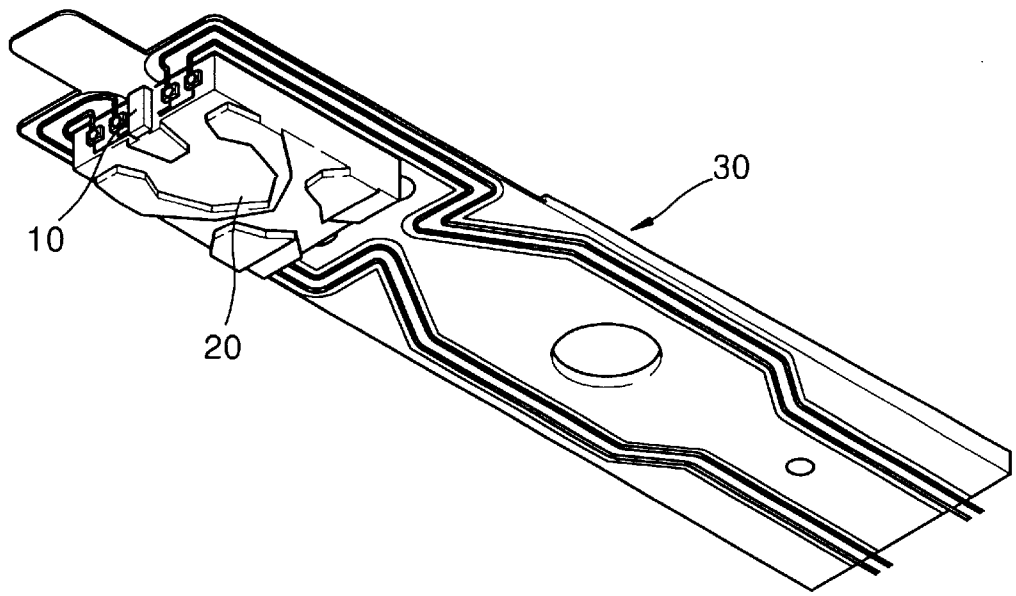
FIG. 1 is a perspective view showing a conventional slider having a swing arm installed thereon.
Figure 2:
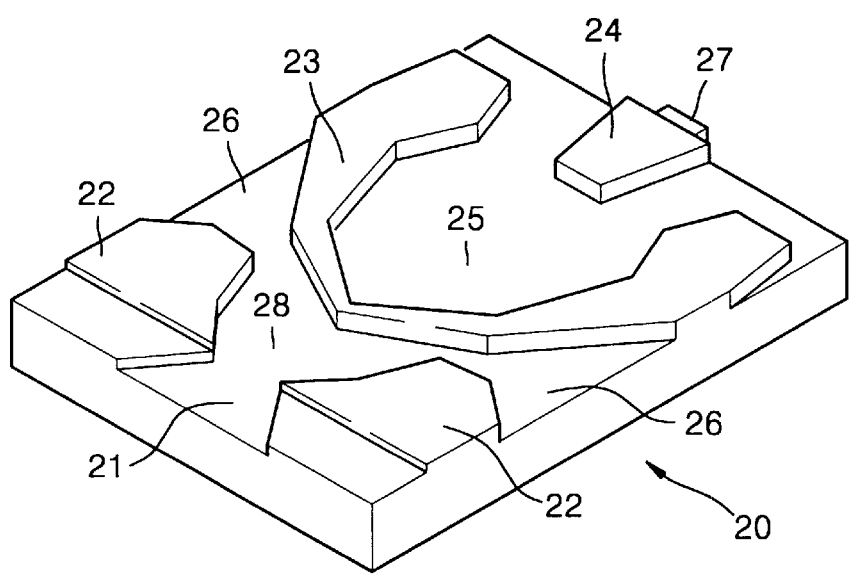
FIG. 2 is a perspective view showing the slider of FIG. 1.
Figure 3:
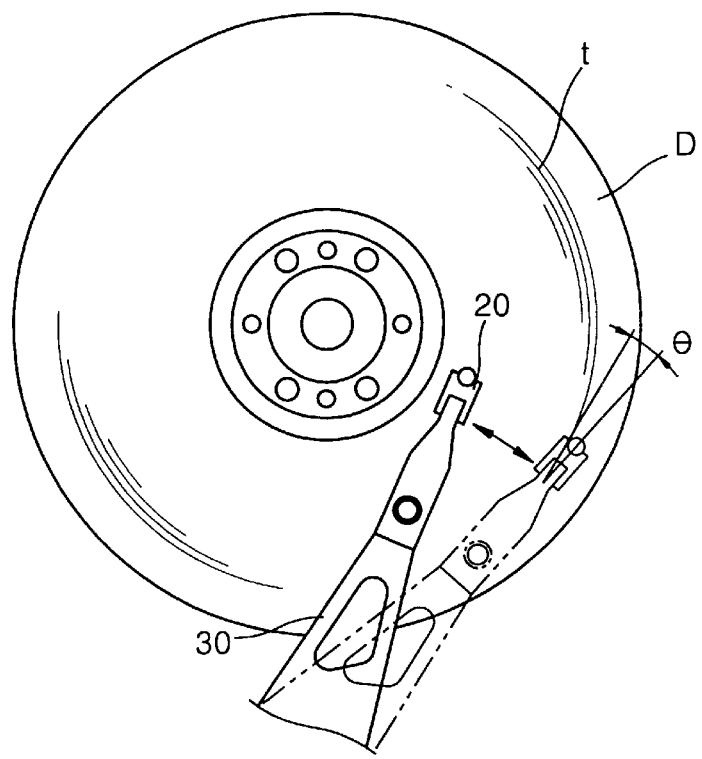
FIG. 3 is a plan view for explaining a change of a skew angle according to pivot of a swing arm.
Figure 4:
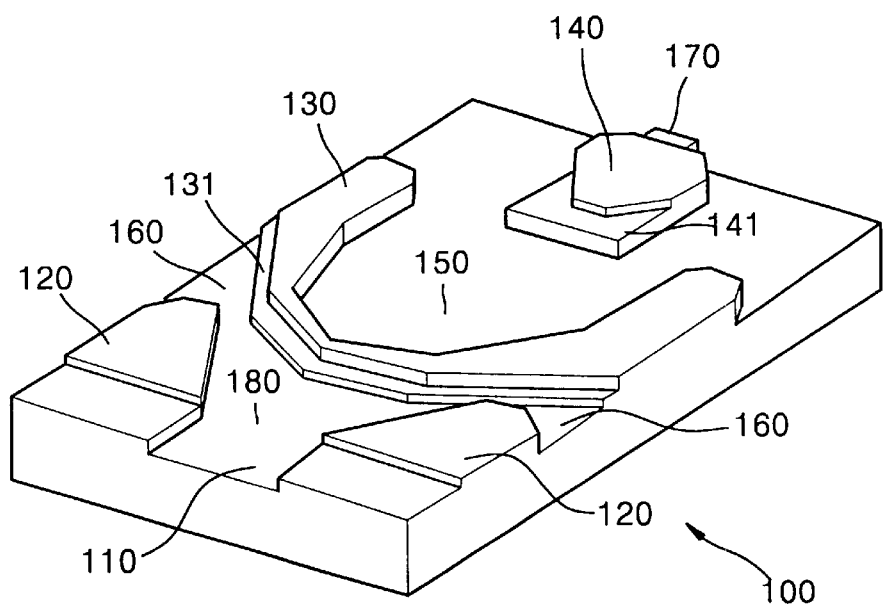
FIG. 4 is a perspective view showing a negative pressure air bearing slider according to a preferred embodiment of the present invention.

Referring to FIG. 4, a negative pressure air bearing slider 100 according to a preferred embodiment of present invention includes a pair of front rails 120 installed at the front side of the slider 100 where air enters, a negative pressure rail 130 having a boomerang shape disposed at the rear of the front rails 120, a rear rail 140 disposed at the rear of a negative pressure space 150 formed between both wings of the boomerang-shaped negative pressure rail 130 and where a magnetic head 170 is installed. An air inlet passage 110 through which air enters is formed between the front rails 120. The air inlet passage 110 is connected to air exhaust or outlet passages 160 branching in two separate directions along the wings of the negative pressure rail 130. Thus, the air entering the front side of the slider 100 generates positive pressure while passing over horizontal surfaces of the rails 120, 130 and 140. Also, the air passing through the air inlet passage 110 and exhausted through the air exhaust passages 160 generates positive pressure at the positive pressure space 180. Since the air passing over the negative rail 130 entrains the air in the negative pressure space 150 together therewith, negative pressure is formed in the negative pressure space 150. Thus, as a disk (not shown) rotates, the slider 100 can maintain a position of floating as the positive pressure and negative pressure generated by the air entering the front side of the slider 100 are balanced.

A stepped portion 131 protruding toward the air exhaust passages 160 is formed at the negative pressure rail 130. The stepped portion 131 serves to narrow the air exhaust passages 160 compared to a conventional slide. However, since the stepped portion 131 is lower than the horizontal surface of the negative pressure rail 130, it does not directly contact the disk.

In the slider 100 having the above structure, when air enters the front side of the slider 100 as the disk begins rotating, although some of the air entering through the air inlet passage 110 is exhausted through the air exhaust passages 160, compared to the conventional slider, a large amount of air can pass over the negative pressure rail 130 and above the negative pressure space 150 by being interrupted by the stepped portion 131. Accordingly, when the skew angle increases, since the flow of the air exhausted directly through the air exhaust passages 160 is restricted by the stepped portion 131, negative pressure in the negative pressure space 150 can be maintained more stably than in the conventional slider.

A stepped portion 141 is formed at the rear rail 140, which compensates for lowering of positive pressure of the rear rail 140 after the magnetic head 170 is installed in the case in which the flow of air toward the negative pressure space 150 is weakened. That is, since the stepped portion 141 primarily compresses air, even when the amount of air passing over the stepped portion 141 is reduced, a predetermined positive pressure can be maintained.

Thus, the stepped portion 131 of the negative pressure rail 130 can prevent a change in negative pressure due to the generation of a skew angle. In addition, by forming the stepped portion 141 at the rear rail 140, a change in positive pressure at the rear rail 140 can be restricted. As a result, a change in the height of floating of the slider 100 due to the change of a skew angle can be restricted. Since the two stepped portions 131 and 141 are formed to be lower than the horizontal surfaces of the negative pressure rail 130 and the rear rail 140, respectively, damage due to contact with the disk when the disk begins and ends rotating can be prevented.

Figure 5:
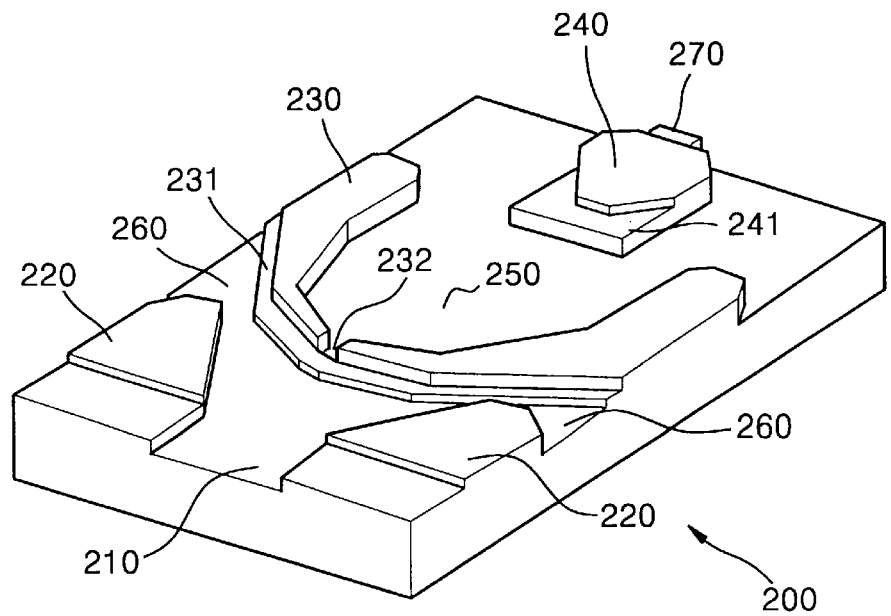
FIG. 5 is a perspective view showing a negative pressure air bearing slider according to another preferred embodiment of the present invention.

Referring to FIG. 5, a negative pressure air bearing slider 200 according to another preferred embodiment of the present invention, like the above-described preferred embodiment, includes a pair of front rails 220, a negative pressure rail 230 having a stepped portion 231 protruding toward air exhaust or outlet passages 260, and a rear rail 240 having a stepped portion 241 formed toward a negative pressure space 250 and where a magnetic head 270 is installed. However, it is characteristic that an opening 232 for connecting an air inlet passage 210 and the negative pressure space 250 is formed at the middle portion of the negative pressure rail 230. The opening 232 helps the slider 200 lift faster above a disk (not shown) when the disk begins rotating by preventing the negative pressure of the negative pressure space 250 from increasing too much. That is, when the negative pressure of the negative pressure space 250 increases too much, since a force to pull the slider 200 toward the disk increases, the slider 200 is not lifted fast when the disk begins rotating so that the disk may be damaged by the slider 200. Thus, by forming the opening 232, the negative pressure is slightly lowered so that the slider 200 can be lifted fast at the beginning of rotation, thereby preventing any damage to the disk.

Figure 6:
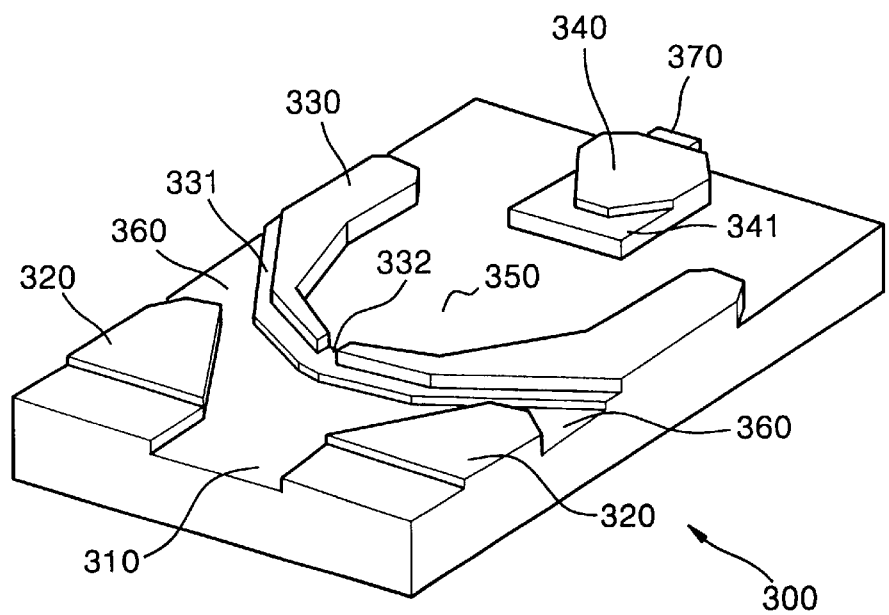
FIG. 6 is a perspective view showing a negative pressure air bearing slider according to yet another preferred embodiment of the present invention.

Next, referring to FIG. 6, a slider 300 according to yet another preferred embodiment of the present invention, like the above-described other preferred embodiment, includes a pair of front rails 320 having an air inlet passage 310 interposed therebetween, a negative pressure rail 330 having a stepped portion 331 protruding toward air exhaust or outlet passages 360, and a rear rail 340 having a stepped portion 341 formed toward a negative pressure space 350 and where a magnetic head 370 is installed. Contrary to the above-described other preferred embodiment in which the opening 232 is formed to extend to the bottom surface of the negative pressure space 250, in the present preferred embodiment, an opening 332 is formed to extend to the height of the stepped portion 331. As shown in both embodiments, the openings 232 and 332 make it possible for the sliders 200 and 300 to be lifted fast during the initial operation. These embodiments show that such modifications of the opening are possible. Thus, in the present embodiment, the slider 300 can be lifted fast and maintained stably at a uniform height by the stepped portions 331 and 341 of the negative pressure rail 330 and the rear rail 340.

As described above, in the negative pressure air bearing slider according to the present invention, since the stepped portion is formed at the negative pressure rail, a change in pressure when a skew angle changes can be restricted. Also, the lifted slider can be stably maintained at a uniform height.

It is contemplated that numerous modifications may be made to the negative pressure air bearing slider of the present invention without departing from the spirit and scope of the invention as defined in the following claims.

What is claimed is:

1. A negative pressure air bearing slider comprising:

a pair of front rails having a predetermined air inlet passage interposed therebetween at a front side of the slider where air enters;

a negative pressure rail disposed at a rear of the front rails and forming air outlet passages connected to the air inlet passage, and forming a negative pressure space where negative pressure is generated according to a flow of air at a rear of the negative pressure rail; and a rear rail disposed at a rear of the negative pressure space, where a magnetic head is installed, wherein a stepped down portion protruding toward the air outlet passages is formed to extend along an entire front of the negative pressure rail and wherein a further stepped portion protruding toward the negative pressure space is formed at the rear rail.

2. The slider as claimed in claim 1, wherein an opening is formed in the negative pressure rail to connect the air inlet passage and the negative pressure space.

3. The slider as claimed in claim 1, wherein the negative pressure rail is boomerang shaped.

* * * * *